(12) United States Patent
Suelzle

(10) Patent No.: US 7,762,390 B2
(45) Date of Patent: Jul. 27, 2010

(54) WIRE-HOOK CONNECTOR AND CONVEYOR OR BELT END PROVIDED THEREWITH

(75) Inventor: Walther Suelzle, Rosenfeld (DE)

(73) Assignee: Wilhelm Suelzle E.K., Rosenfeld (DE)

( * ) Notice: Subject to any disclaimer, the term of this patent is extended or adjusted under 35 U.S.C. 154(b) by 435 days.

(21) Appl. No.: 11/666,705

(22) PCT Filed: Nov. 17, 2005

(86) PCT No.: PCT/EP2005/012331

§ 371 (c)(1),
(2), (4) Date: Jun. 14, 2007

(87) PCT Pub. No.: WO2007/025567

PCT Pub. Date: May 8, 2007

(65) Prior Publication Data

US 2009/0057105 A1 Mar. 5, 2009

(30) Foreign Application Priority Data

Sep. 1, 2005 (DE) .................. 10 2005 041 683

(51) Int. Cl.
*B65G 17/00* (2006.01)
(52) U.S. Cl. .................................. 198/844.2
(58) Field of Classification Search ............... 198/844.2
See application file for complete search history.

(56) References Cited

U.S. PATENT DOCUMENTS

| 948,574 | A | | 2/1910 | Conn |
| 355,984 | A | | 9/1931 | Hiscock |
| 2,420,783 | A | | 5/1947 | Koester |
| 2,481,085 | A | | 9/1949 | Claus |
| 4,708,558 | A | * | 11/1987 | Musil ........................ 411/457 |
| 5,327,823 | A | * | 7/1994 | Clevenger et al. ............. 100/88 |
| 7,140,487 | B2 | * | 11/2006 | Motoda .................... 198/844.2 |
| 2003/0150698 | A1 | * | 8/2003 | Herold ..................... 198/844.2 |

FOREIGN PATENT DOCUMENTS

| CH | 221375 | 5/1942 |
| DE | 732524 | 3/1943 |
| DE | 826723 | 1/1952 |
| EP | 1338825 | 8/2003 |
| FR | 946203 | 5/1949 |
| GB | 24564 | 4/1910 |

* cited by examiner

*Primary Examiner*—Mark A Deuble
(74) *Attorney, Agent, or Firm*—Jordan and Hamburg LLP

(57) ABSTRACT

Wire-hook connectors with a series of individual wire hooks that are not connected to one another, are arranged spaced apart by pair and parallel to one another, and are held only on strip-like carrier material, which is a film, fabric or shaped plastic part, in corresponding openings. The wire hooks are fabricated of, for example, round or flat steel wire, each of which has two hook legs that are unequal in length and that run at an angle to one another on either side of the buckling area formed thereby. The hook legs have hook tips at ends thereof that are bent towards one another, whereby a wire hook is arranged centrally between a mutually adjacent pair of mutually parallel wire hooks, with mirror symmetry with respect to the plane formed by the angle bisectors thereof.

14 Claims, 1 Drawing Sheet

WIRE-HOOK CONNECTOR AND CONVEYOR OR BELT END PROVIDED THEREWITH

BACKGROUND OF THE INVENTION

The invention relates to a generic wire-hook connector including side by side wire hooks that are held on a carrier material and which serve as a belt connector for connecting ends of adjacent belts ends one to the other, and to a conveyor or belt provided therewith, forming a conveyor splice.

Such mechanical wire-hook connectors in which the carrier material comprises paper are known as "carded" connectors. The individual wire hooks in such wire-hook connectors have hook legs that are pre-bent into a V-shape and that have different lengths. Hook tips that run toward one another are disposed on both hook leg ends and are pressed by means of suitable apparatus and machines into the end of, for example, a transport conveyor, hereinafter also called a conveyor, or conveyor belt, hereinafter also called a belt, connecting another end of a conveyor, in that the projecting wire hooks from one end of the other conveyor are inserted into the gaps between the wire hooks of the other end of the conveyor and a hinge pin is inserted through the through-opening thus formed.

These known, in particular, carded, wire-hook connectors have proved themselves to best advantage especially when used in the laundry industry and in conveyor filters because, after a few weeks of run-time, the conveyor splice, due to very different loads over the entire conveyor width, is seldom flat, but rather, is frequently wavy.

In the known carded wire-hook connectors, the carrier material, made of paper, assumes a spacer function for the individual wire hooks until they are installed. The carrier material also guides the wire hooks during the pressing process, so that the latter are all bent uniformly in one direction. After the pressing process, the paper in the strip is no longer needed, in fact is interfering, and must be removed. Depending on the conveyor or belt thickness, length of the hook tips, and pressure used, this can be very time-intensive during installation, because the hook tips pass through the paper and clamp it tightly.

In practice, conveyors in the laundry industry, filter conveyors, and corrugated board belts are frequently pre-treated in the connection area, i.e., different stabilization processes are used in the area of the conveyor splice so that the wire-hook connectors have a better grip or can be installed with high pressure. Furthermore, this type of pre-treatment also helps to ensure that the wire-hook connectors do not pull apart under the tensile load of the conveyor.

In many cases the wire-hook connectors are covered in another work step. This protects the wire-hook connectors against wear and also protects the items being conveyed against damage from any projecting, pointed parts of the individual wire hooks.

The pre-treatment of the belt, which is somewhat elastic in the longitudinal direction, is performed, for example, in the laundry industry, by dipping the two ends of the belt into clear varnish or adhesive and then drying, sometimes for several hours, until the varnish or adhesive has cured and during installation does not stick to the machine or equipment. Alternatively, patches are adhesively applied using a thermotransfer method or are placed around the conveyor ends and sewn thereto. All of the methods used in the past require several work steps and are time-consuming. All of the measures used heretofore are ultimately intended to protect the conveyor from fraying. These known methods do not protect the items being conveyed from damage, for example, terrycloth towels in the laundry industry. Another suggested solution for protecting the items being conveyed is embodied in wire-hook connectors having individual wire hooks which are connected to a crosswire, sometimes referred to as crosswire connectors (see, for example, EP 1 338 825 A).

In the conveyor filter industry, the connection area is densified, for example, with two-component adhesives prior to installation. In this case, as well, the drying time for the adhesive until the wire-hook connectors can finally be installed is crucial to production, not only because of the storage space required, but other considerations as well.

Finally, in the corrugated board industry, the conveyors are pre-densified, sometimes with the addition of heat to 200° C. Then, the wire-hook connectors are installed. Afterwards, they are sometimes coated in order to prevent a damaging antistatic charge during the production process and to reduce the wear on the wire-hook connector.

In other industrial fields, the wire-hook connectors are "let in" to the conveyor. This is done for instance by heating the wire-hook connectors during or after installation, and also by removing the conveyor covers on the conveyor top side and/or conveyor bottom side, and then re-vulcanizing the removed cover after installing the wire-hook connectors.

The aforementioned crosswire hooks, i.e., individual wire hooks that are held together by virtue of being, for example, welded to a crosswire, and that therefore do not require any paper as a carrier material, have been known for a number of years. Use of such wire-hook connectors in the above-mentioned industries and the conveyors and belts used in them is limited, however. It sometimes happens, that due to, for example, cambered roll rattle, the crosswire breaks and projecting wire parts, despite being covered, damage the items being conveyed. Moreover, the risk of injury to the operators of the machine from small projecting wire parts cannot be overlooked. Due to the conveyor splices not running parallel, sometimes the crosswire breaks in filter conveyors and corrugated board belts, resulting in residual pieces sometimes traveling into the filtered material. In order to minimize this risk, for this known wire-hook connector, an additional cover element is placed over the series of wire hooks during production or prior to installation and after installation it fulfills a cover function, in particular for the crosswire (see, for example, EP 1 338 825 A).

The underlying object of the invention is to create a generic wire-hook connector in a manner that is simpler and less complex to install.

SUMMARY OF THE INVENTION

The above object is thus attained in a generic wire-hook connector which includes individual wire hooks that are not connected to one another and that are arranged in series and are spaced apart by pair and parallel to one another, each of wire hooks including a buckling area and two hook legs that are unequal in length and that run at an angle to one another on either side of said buckling area. The hook legs include hook tips at ends thereof that are bent towards one another. One of the wire hooks is arranged centrally between a mutually adjacent pair of mutually parallel wire hooks, with mirror symmetry with respect to the plane formed by the angle bisectors thereof, and the wire hooks are held only on a generally strip-shaped carrier material comprised of a film of plastic or textile fabric in corresponding openings formed therein. Such approach is in contrast to the use of paper or cardboard in the prior art. Rather, in accordance with the advantageous embodiments of the invention, the carrier material is embodied as a film made of plastic or adhesive-coated textile fabric, possibly matched in color to the transport conveyor to be connected.

Thus, instead of the normal paper or cardboard carding, in accordance with the invention, a carrier material made of an adhesive fabric, thermoplastic films, other films, or shaped parts made of plastic are used in the wire-hook connector. This carrier material is, for example, pre-punched with the distribution of the wire hooks that will be used. Then the wire-hook connector is inserted into the openings created by the punching and packaged. Advantageously, the carrier material is comprised of polyurethane ("PU"), polyvinyl chloride ("PVC") or other thermoplastic.

As in the prior art, the carrier material assumes the function of holding during transport and guiding the individual wire hooks during installation until the wire hooks are finally fixed on the conveyor or belt; in contrast to the prior art, however, it does not have to be removed after the pressing process. On the contrary, the carrier material held by the individual wire hooks also surrounds the separated and thus less secure end on the edge of the conveyor or belt and stabilizes it in this manner. The inventive wire-hook connectors are thus embodied in a manner that is simpler and less complex to install, not the least because no crosswire is required.

In one advantageous further development of the invention, the carrier material made of textile fabric can be pre-coated with adhesive or provided with a thermoplastic on one side, so that it can adhere to or fuse with the end of a belt or conveyor when heat is emitted via the pressing jaws of the installation device during formation of the so-called conveyor splice when pressing the individual wire hooks into the end of a belt or conveyer.

In addition to simpler installation, the thermally installed carrier material makes a substantial contribution to stabilizing the area of the conveyor splice and replaces the aforesaid known method for stabilizing the edges of the conveyor or belt. Moreover, the wire hooks are largely covered by the carrier material, which reduces wear and abrasion thereon and thus extends the service life of the mechanical wire-hook connector. In accordance with the teaching of the invention, the carrier material is very versatile due to the advantages described in the foregoing, specifically for the individual wire hooks as a holder during the production of the wire-hook connector and during its transport, as a guide element during the installation, as a cover for the conveyor splice, and finally as a height leveler for the conveyor splice.

It is exceedingly important that all of these advantages can be attained with a single work step during production of the conveyor splice, i.e., with less complexity than for the prior art.

Finally, by using different color thermoplastics and films it is possible to use color to match the connection to the conveyor or belt. An additional benefit occurs when the textile tapes and films are preprinted with customer information, for example, logo, telephone number, and/or part number, so that if there is a defect, the end customer can order replacements immediately. In accordance with the invention, the items being conveyed with the conveyor are therefore advantageously better protected against damage when the wire-hook connectors are used.

One exemplary embodiment of the invention is explained in greater detail with reference to the drawings.

DETAILED DESCRIPTION OF THE INVENTION

Figure 1:
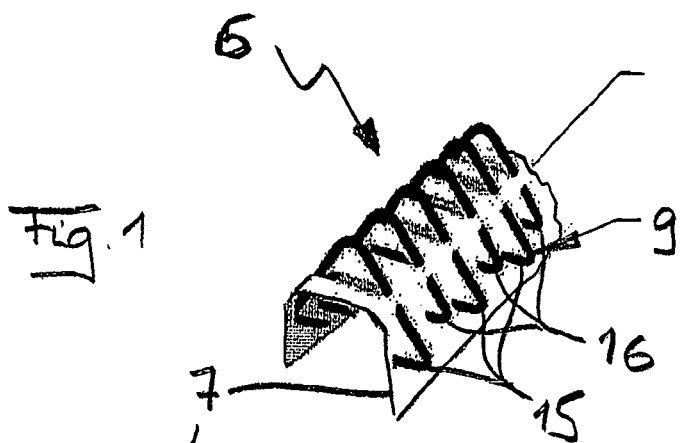
FIG. 1 is a perspective elevation of a wire-hook connector.
Figure 2:
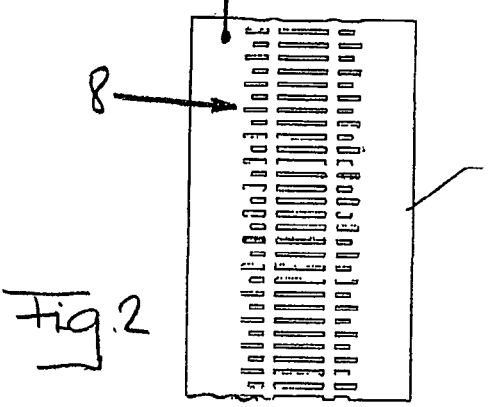
FIG. 2 is a top view of the punched carrier material in accordance with FIG. 1.

The wire-hook connector illustrated in FIG. 1, generally designated 6, has a carrier material 7 made of a textile fabric, preferably an adhesive fabric, that is in a U-shape, open at the bottom, and that is provided with a plurality of openings for individual wire hooks 9. As illustrated in FIG. 2, the openings are embodied as punches 8 that are arranged spaced apart from and parallel to one another.

Figure 3:
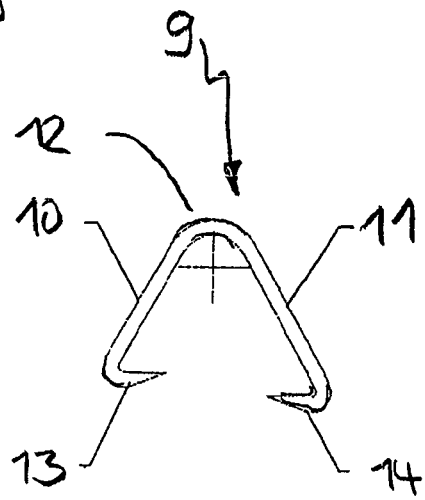
FIG. 3 is a side elevation of an individual wire hook in accordance with FIG. 1.

Each V-shaped pre-bent individual wire hook 9 made of (round) steel wire has two hook legs 10, 11 that are unequal in length and that run at an angle to one another on either side of a buckling area 12 formed thereby, and that have at ends thereof hook tips 13, 14 that are bent towards one another (FIG. 3).

These individual wire hooks 9 are inserted into the plurality of punches 8 in the flat carrier material 7. When folded in the U-shape that is open on the bottom, as shown in FIG. 1, the wire hooks are fixed in the punches 8 and form the wire-hook connector 6. The size, width, and distance separating the punches 8 from one another is a function of the size of the wire hooks 9.

Then, a series 15 of individual wire hooks 9 that are not connected to one another and that are arranged spaced apart by pair and parallel to one another are added to the carrier material 7. A wire hook 9 is arranged centrally between each mutually adjacent pair of mutually parallel wire hooks 9, with mirror symmetry with respect to the plane formed by the angle bisectors thereof, and all of these together also form a series 16 of wire hooks 9 that are not joined to one another and that are arranged spaced apart by pair and parallel to one another, so that a short hook leg from the series 15 is adjacent to two long hook legs from the other series 16. Thus, on a surface of the carrier 9 a shorter leg of one of the hooks 9 from the series 15 alternates with a longer leg of each immediately adjacent one of the hooks 9 from the series 16 so that a plane of symmetry of the hooks 9 having a shorter leg on the surface of the carrier 9 is also a plane of symmetry for a set of said hooks 15 consisting of its hook 9 having a shorter leg on the surface of the carrier 9 and the two hooks 9 immediately adjacent thereto.

Figure 4:
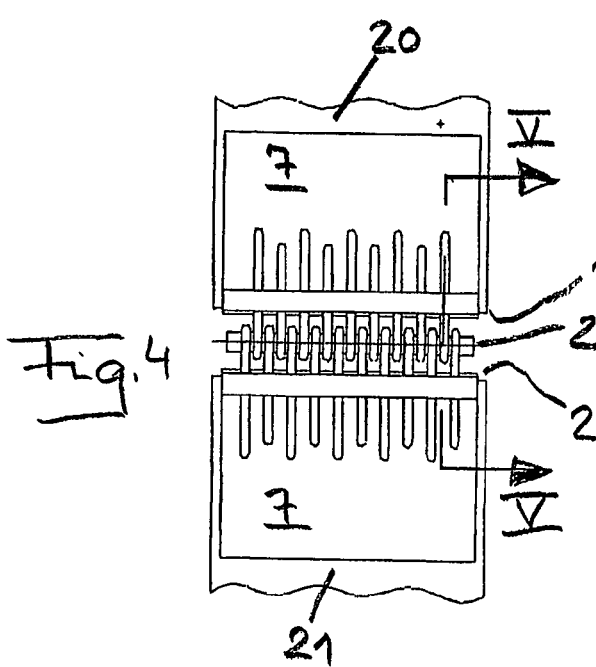
FIG. 4 is a top plan view of two wire-hook connectors installed on the ends of conveyors.
Figure 5:
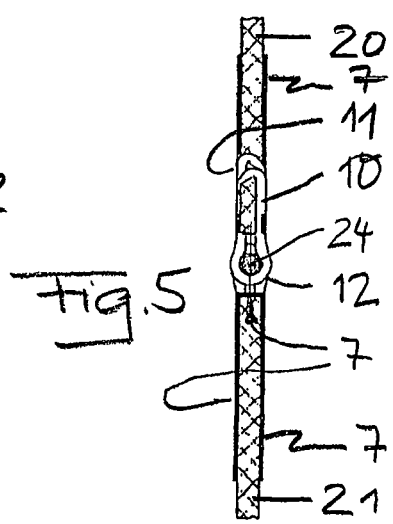
FIG. 5 is a section view of the wire-hook connectors installed on the conveyors taken along line V-V in FIG. 4.

The wire-hook connectors 6 are installed on facing ends 22, 23 of two conveyors 20, 22 by pressing with heat, as illustrated in FIG. 4. The hook tips 13, 14 do not come out on the other side of the conveyor, but rather are covered by the carrier material 7. In addition, the edge of each end 22, 23 of the conveyor 20, 21 is covered by a part of the carrier material 7, stabilizing each edge.

The projecting wire hooks 9 of the other end 23 of the other band 21 are inserted into the gaps between the conveyor splice that is formed by the wire hooks 9 in the one end 22 of the conveyor 20, and a coupling hinge 24 is inserted through the through-opening formed thereby, creating an articulated connection.

The invention claimed is:

1. A wire-hook and hook carrying connector, consisting of: individual wire hooks separated from one another and which are arranged in series and are parallel to one another, each of said wire hooks including a buckling area and two hook legs that are unequal in length and that run at an angle to one another on either side of said buckling area, said hook legs including hook tips at ends thereof that are bent towards one another, one of the wire hooks being arranged centrally between a mutually adjacent pair of mutually parallel other ones of said wire hooks; and a carrier comprising film, fabric or plastic and a plurality of openings therein, said hook legs being positioned within said openings so that the wire hooks are carried by said carrier free from additional carrying structure, and so that on a surface of said carrier a shorter leg of one of said hooks alternates with a longer leg of each immediately adjacent one of said hooks so that a plane of symmetry of said hooks having a shorter leg on said surface of said carrier is also a plane of symmetry for a set of said hooks consisting of said hook having a shorter leg on said surface of said carrier and said two hooks immediately adjacent thereto.

2. A wire-hook connector according to claim 1, wherein said carrier material is generally strip-shaped.

3. A wire-hook connector according to claim 1, wherein said carrier material is comprised of a plastic film.

4. A wire-hook connector according to claim 1, wherein said wire hooks comprise round or flat steel wire.

5. A wire-hook connector according to claim 1, wherein a hot-adhesive coating or an elastic adhesive is provided on one side of said carrier material.

6. A wire-hook connector according to claim 1, wherein said carrier material includes a textile fabric or an adhesive fabric.

7. A wire-hook connector according to claim 5, wherein said carrier material includes a textile fabric or an adhesive fabric.

8. A wire-hook connector according to claim 1, wherein said carrier material includes a plastic selected from the group consisting of PVC, a thermoplastic, and PU.

9. A conveyor splice connecting facing ends of belt segments which collectively form a conveyor, consisting of:

a wire-hook connector including individual wire hooks separated from one another and which are arranged in series and are parallel to one another, each of said wire hooks including a buckling area and two hook legs that are unequal in length and that run at an angle to one another on either side of said buckling area, said hook legs including hook tips at ends thereof that are bent towards one another, one of the wire hooks being arranged centrally between a mutually adjacent pair of mutually parallel other ones of said wire hooks, said wire hook connector further including a carrier comprising film, fabric or plastic and a plurality of openings therein, said hook legs being positioned within said openings so that the wire hooks are carried by said carrier free from additional carrying structure, and so that on a surface of said carrier a shorter leg of one of said hooks alternates with a longer leg of each immediately adjacent one of said hooks so that a plane of symmetry of said hooks having a shorter leg on said surface of said carrier is also a plane of symmetry for a set of said hooks consisting of said hook having a shorter leg on said surface of said carrier and said two hooks immediately adjacent thereto;

said wire-hook connector being attached to each of the ends of the belt segments, the material comprising said carrier being matched to a conveyor material of said belt segments in terms of adhesive or fusing properties, and said carrier material being securely physically joined to said conveyor material by adhesive and/or fusing.

10. A conveyor splice according to claim 9, wherein said carrier material is positioned to completely enclose at least one of the facing ends of said belt segments.

11. A conveyor splice according to claim 9, wherein said wire-hook connector includes a hot-adhesive coating or an elastic adhesive provided on one side of said carrier material.

12. A conveyor splice according to claim 9, wherein said carrier material includes a textile fabric or an adhesive fabric.

13. A conveyor splice according to claim 9, wherein said carrier material includes a textile fabric or an adhesive fabric.

14. A conveyor splice according to claim 9, wherein said carrier material includes a plastic selected from the group consisting of PVC, a thermoplastic, and PU.

* * * * *